US012172299B2

(12) United States Patent
Kraetschmer et al.

(10) Patent No.: US 12,172,299 B2
(45) Date of Patent: Dec. 24, 2024

(54) GRIPPING SYSTEM AND LABORATORY AUTOMATION SYSTEM

(71) Applicant: Roche Diagnostics Operations, Inc., Indianapolis, IN (US)

(72) Inventors: Marius Kraetschmer, Kirchheim unter Teck (DE); Andreas Decool, Leutenbach (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 742 days.

(21) Appl. No.: 17/303,373

(22) Filed: May 27, 2021

(65) Prior Publication Data

US 2021/0387360 A1 Dec. 16, 2021

(30) Foreign Application Priority Data

Jun. 16, 2020 (EP) ..................... 20180378

(51) Int. Cl.
*B25J 15/04* (2006.01)
*B01L 9/00* (2006.01)

(52) U.S. Cl.
CPC ............. *B25J 15/0475* (2013.01); *B01L 9/50* (2013.01); *B25J 15/0408* (2013.01); *B25J 15/0491* (2013.01)

(58) Field of Classification Search
CPC ............... B25J 15/0475; B25J 15/0408; B25J 15/0491; B25J 15/0014; B25J 15/04; B01L 9/50

(Continued)

(56) References Cited

U.S. PATENT DOCUMENTS 4,621,409 A  11/1986  Weixel
4,913,617 A *  4/1990  Nicholson .............. B25J 9/0084
                                                                901/29

(Continued)

FOREIGN PATENT DOCUMENTS

CN     102576032      7/2012
CN     103170981 A    6/2013

(Continued)

OTHER PUBLICATIONS

European Search Report issued Sep. 7, 2020, in Application No. 20180378.0, 2 pp.

*Primary Examiner* — Paul T Chin
(74) *Attorney, Agent, or Firm* — Woodard, Emhardt, Henry, Reeves & Wagner, LLP

(57) ABSTRACT

A gripping system is provided comprising: gripping fingers of a first type, gripping fingers of a second type, a gripping device for handling sample containers, wherein the gripping device comprises base portions, wherein a gripping finger of the first type and a gripping finger of the second type are releasably fixable to the base portions, and a drive, wherein the drive is adapted to move at least one of the base portions relative to the other base portions to cause a gripping or a releasing of a sample container, and a gripping finger change device, wherein the gripping finger change device is adapted to store gripping fingers of the first type and gripping fingers of the second type, and wherein the gripping finger change device is adapted to replace a gripping finger of the first type fixed to a base portion by a gripping finger of the second type.

10 Claims, 3 Drawing Sheets

(58) Field of Classification Search
USPC .................................................. 294/213, 86.4
See application file for complete search history.

(56) References Cited

U.S. PATENT DOCUMENTS

| | | | |
|---|---|---|---|
| 5,993,365 A * | 11/1999 | Stagnitto | B25J 15/0491 |
| | | | 901/41 |
| 7,559,265 B2 * | 7/2009 | Mizuno | B23B 31/1071 |
| | | | 901/29 |
| 9,164,113 B2 | 10/2015 | Friedman et al. | |
| 9,757,863 B2 | 9/2017 | Suzuki | |
| 11,235,475 B2 * | 2/2022 | Kayama | B25J 15/0475 |
| 2003/0045784 A1 | 3/2003 | Palatnik et al. | |
| 2009/0139375 A1 * | 6/2009 | Hathaway | B25J 15/0416 |
| | | | 700/275 |

FOREIGN PATENT DOCUMENTS

| | | |
|---|---|---|
| JP | H04-164257 A | 6/1992 |
| JP | 2001-087971 A | 4/2001 |
| JP | 2013-091121 A | 5/2013 |
| JP | 2013-094930 A | 5/2013 |
| JP | 2017-012415 A | 1/2017 |
| JP | 6709023 B2 | 5/2020 |

* cited by examiner

GRIPPING SYSTEM AND LABORATORY AUTOMATION SYSTEM

CROSS-REFERENCE TO RELATED APPLICATIONS

This application claims priority to European Patent Application No. EP 20180378.0, filed 16 Jun. 2020, the disclosure of which is hereby incorporated by reference in its entirety.

TECHNICAL FIELD

The disclosure relates to a gripping system and to a laboratory automation system.

SUMMARY

Although the embodiments of the present disclosure are not limited to specific advantages or functionality, the disclosure provides for a gripping system and a laboratory automation system that is highly flexible.

In accordance with one embodiment of the present disclosure, a gripping system is provided comprising gripping fingers of a first type, gripping fingers of a second type, a gripping device for handling sample containers, wherein the gripping device comprises base portions, wherein a gripping finger of the first type and a gripping finger of the second type are releasably fixable to the base portions, and a drive, wherein the drive is adapted to move at least one of the base portions relative to the other base portions to cause a gripping or a releasing of a sample container, and a gripping finger change device, wherein the gripping finger change device is adapted to store gripping fingers of the first type and gripping fingers of the second type, and wherein the gripping finger change device is adapted to replace a gripping finger of the first type fixed to a base portion by a gripping finger of the second type.

In accordance with another embodiment of the present disclosure, a laboratory automation system is provided comprising a laboratory station, and a gripping system according to one of the preceding claims transferring sample containers to and from the laboratory station.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
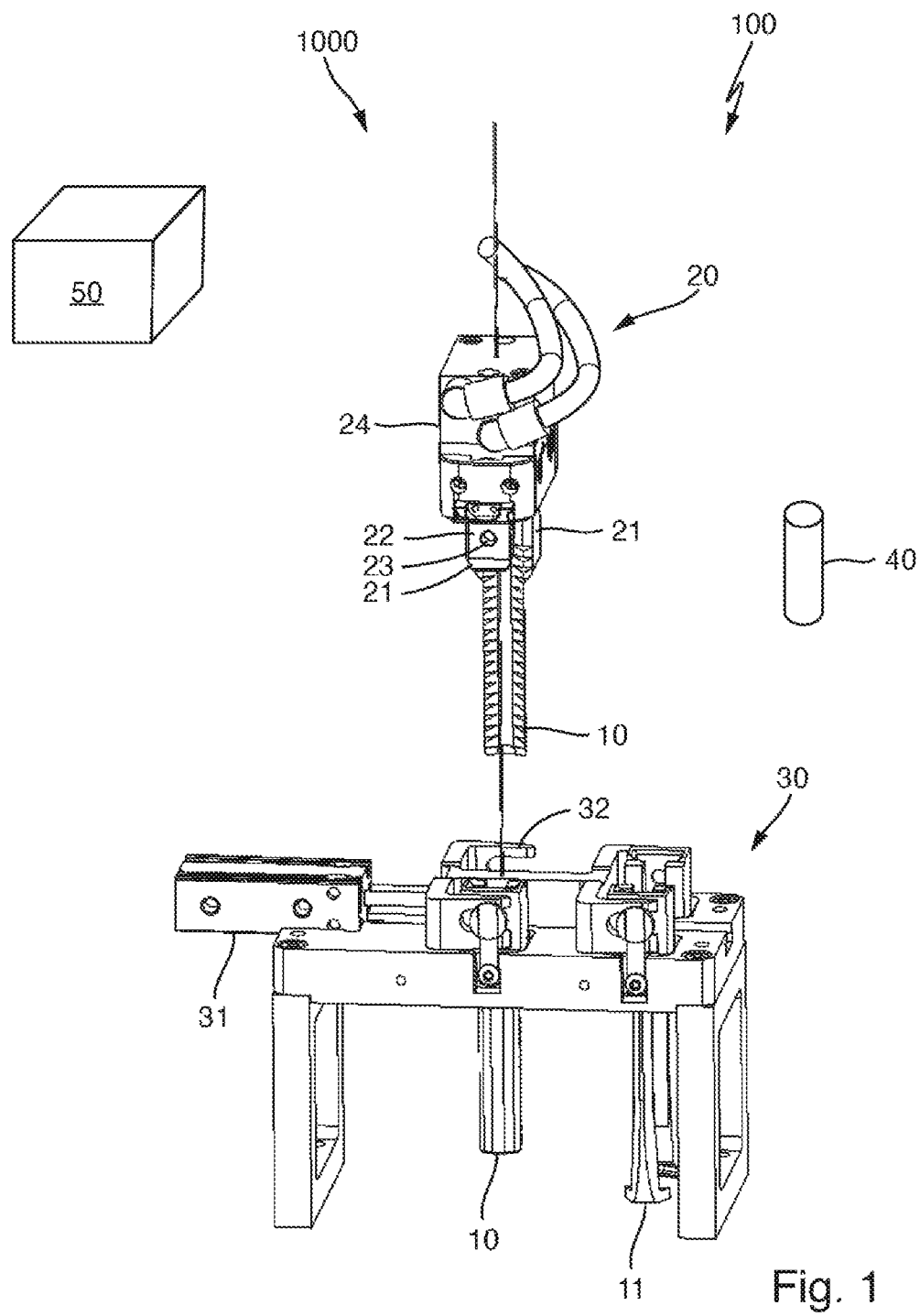
FIG. 1 depicts a perspective view of a laboratory automation system comprising a gripping system.

Skilled artisans appreciate that elements in the figures are illustrated for simplicity and clarity and have not necessarily been drawn to scale. For example, dimensions of some of the elements in the figures may be exaggerated relative to other elements to help improve understanding of the embodiment(s) of the present disclosure.

DETAILED DESCRIPTION

The gripping system comprises gripping fingers, in particular gripping finger pairs or a set of gripping fingers, of a first type and gripping fingers, in particular gripping finger pairs or a set of gripping fingers, of a second type.

The gripping system further comprises a gripping device for handling sample containers, e.g., being adapted to pick-and-place sample containers, etc. Reference insofar is also made to the relevant technical literature regarding conventional gripping devices.

The gripping device comprises base portions, e.g., exactly two base portions, wherein a gripping finger of the first type is releasably fixable to a corresponding base portion and alternatively a gripping finger of the second type is releasably fixable to a corresponding base portion. In other words, both types of gripping fingers are releasably fixable to a corresponding base portion.

The gripping device further comprises a drive, wherein the drive is adapted to move at least one of the base portions relative to the other base portion(s) to cause a gripping or a releasing of a sample container to be handled.

The gripping system further comprises a gripping finger change device. The gripping finger change device is adapted to store gripping fingers of the first type and gripping fingers of the second type, and is adapted to change gripping fingers fixed to the base portions, in particular to change the type of gripping fingers fixed to the base portions.

According to an embodiment, the gripping fingers of the first type are configured to grip a first type of sample containers and the gripping fingers of the second type are configured to grip a second type of sample containers. The types of sample containers may, e.g., differ in their geometrical properties. Alternatively or additionally the sample containers of the first type may be closed by caps and the sample containers of the second type may not be closed by caps.

According to an embodiment, the gripping fingers of the first type have a different finger length than the gripping fingers of the second type. The fingers of the first type may, e.g., be longer or shorter than the fingers of the second type.

According to an embodiment, the base portions respectively comprise a tooth-shaped fixing member having an, in particular circular, opening or through hole. The gripping fingers of the first type and the gripping fingers of the second type respectively comprise a receiving portion being formed such that the tooth-shaped fixing member is partially or fully insertable into the receiving portion. Further, the gripping fingers of the first type and the gripping fingers of the second type respectively comprise a spring-biased bolt, wherein the spring-biased bolt is inserted into the opening of the corresponding tooth-shaped fixing member by means of the spring force when the tooth-shaped fixing member is inserted into the receiving portion as intended.

According to an embodiment, the gripping finger change device comprises a removing actuator being adapted to unplug a spring-biased bolt being inserted into an opening of a corresponding tooth-shaped fixing member out of the opening.

According to an embodiment, the removing actuator comprises fork-shaped removing members, and an electric drive, e.g., comprising an electric motor and a gear. The electric drive is adapted to translationally move the fork-shaped removing members, wherein when being moved to a removing position the fork-shaped removing members exert a removing force being opposite to the spring force to the spring-biased bolt such that the spring-biased bolt is finally unplugged out of the corresponding opening.

According to an embodiment, a head or collar is formed at a respective spring-biased bolt. A respective receiving portion is formed by a front wall and two side walls. In particular the front wall and the side walls do not complete enclose a volume. The front wall has an, in particular circular, opening or through hole, wherein the spring-biased bolt at least partially extends through the opening of the front wall. The collar is arranged outside of the opening, in particular at a side of the front wall facing away from the gripping finger. A respective fork-shaped removing member comprises two inclined tines, wherein when being moved to the removing position the inclined tines are placed or moved between the front wall and the collar such that the spring-biased bolt is axially moved towards the inclined tines.

According to an embodiment, in order to fix a gripping finger of any type stored in the gripping finger change device to a base portion: the gripping device is adapted to move the base portion towards the gripping finger stored in the gripping finger change device to be fixed to the base portion, such that the tooth-shaped fixing member of the base portion is inserted into the receiving portion of the gripping finger stored in the gripping finger change device and the spring-biased bolt slides into the opening of the tooth-shaped fixing member by spring force.

According to an embodiment, in order to remove a gripping finger fixed to a corresponding base portion: the gripping device is adapted to insert the gripping finger fixed to the base portion and to be removed into a free storage position of the gripping finger change device, the gripping finger change device is adapted to control the removing actuator to unplug the spring-biased bolt being inserted into the opening of the tooth-shaped fixing member out of the opening, and the gripping device is adapted to remove the tooth-shaped fixing member inserted into the receiving portion of the gripping finger out of the receiving portion of the gripping finger.

According to an embodiment, the removing actuator when actuated prevents a movement of the gripping finger to be removed in z direction, and the gripping device removes the tooth-shaped fixing member inserted into the receiving portion of the gripping finger by moving the tooth-shaped fixing member in z direction.

The laboratory automation system comprises a conventional laboratory station, e.g., being adapted to process laboratory samples contained in the sample containers, and a gripping system as described above transferring sample containers, e.g., from the laboratory station to a sample container rack and/or transferring sample containers to the laboratory station from the sample container rack.

FIG. 1 schematically depicts a top view of a laboratory automation system 1000 comprising a laboratory station 50 and a gripping system 100 transferring sample containers 40 to and from the laboratory station 50.

The gripping system 100 comprises gripping fingers 10 of a first type, gripping fingers 11 of a second type, a gripping device 20 using the gripping fingers 10/11 for handling the sample containers 40, and a gripping finger change device 30.

The gripping device 20 comprises two opposing base portions 21, wherein the gripping fingers 10/11 are releasably fixable to the base portions 21. The gripping device 20 further comprises a drive 24, wherein the drive 24 is adapted to translationally move the base portions 21 relative to one another to cause a gripping or a releasing of a sample container 40 to be handled.

The gripping finger change device 30 stores gripping fingers 10 of the first type and gripping fingers 11 of the second type. If a type of sample containers 40 to be handled changes, the gripping finger change device 30 may replace gripping fingers 10 of the first type fixed to the two base portions 21 by gripping fingers 11 of the second type or vice versa, depending on the type of gripping finger matching the type of sample container to be handled.

The gripping fingers 10 of the first type have a shorter finger length than the gripping fingers 11 of the second type.

The base portions 21 of the gripping device 20 respectively comprise a tooth-shaped fixing member 22 having a circular through hole 23.

Figure 2:
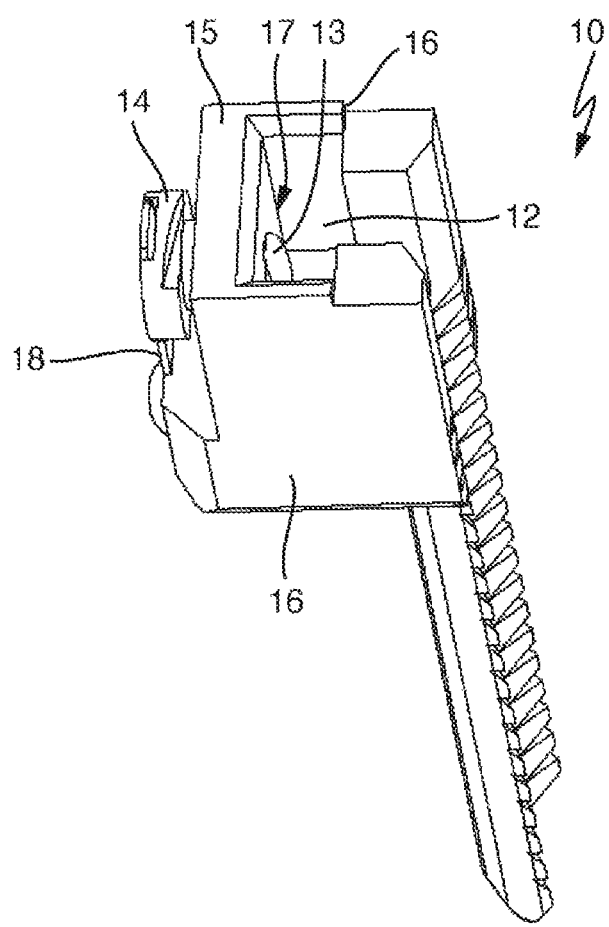
FIG. 2 depicts a perspective view of a gripping finger used in the gripping system of FIG. 1.

Referring to FIG. 2, the gripping fingers 10/11 respectively comprise a receiving portion 12 being formed such that the tooth-shaped fixing member 22 is insertable into the receiving portion 12, and a bolt 13 being biased by a leaf spring 18. The spring-biased bolt 13 is inserted into the opening 23 of the tooth-shaped fixing member 22 by means of the spring force when the tooth-shaped fixing member 22 is inserted into the receiving portion 12.

A collar or head 14 is formed at the spring-biased bolt 13. A receiving portion 12 is formed by a front wall 15 and two side walls 16. The front wall 15 has an opening 17, wherein the spring-biased bolt 13 partially extends through the opening 17 of the front wall 15. The collar or head 14 is arranged outside of the opening 17.

Figure 3:
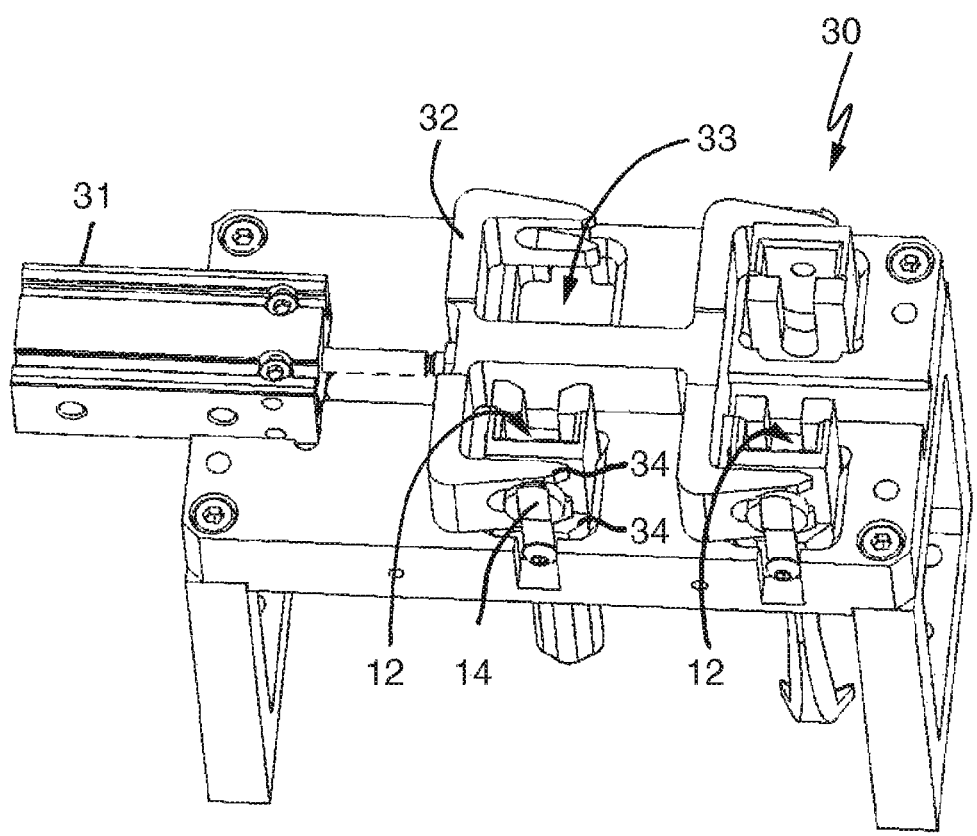
FIG. 3 depicts a perspective view of a gripping finger change device used in the gripping system of FIG. 1.

Referring to FIG. 3, the gripping finger change device 30 comprises a removing actuator being adapted to remove a spring-biased bolt 13 being inserted into an opening 23 of a tooth-shaped fixing member 22 out of the opening 23 during a change of a gripping finger 10/11. The removing actuator comprises fork-shaped removing members 32, and an electric drive 31, wherein the electric drive translationally moves the fork-shaped removing members 32. When moved to a removing position the fork-shaped removing members 32 cause a removing force being opposite to the spring force to the spring-biased bolt 13 such that the spring-biased bolt 13 is removed out of the opening 23. To provide this effect, the fork-shaped removing members 32 comprises two inclined tines 34, wherein when moved to the removing position the inclined tines 34 are placed between the front wall 15 and the collar 14 such that the spring-biased bolt 13 is axially moved in a direction out of the opening 23.

In order to fix a gripping finger 10/11 stored in the gripping finger change device 30 to a base portion 21 the gripping device 20 moves the base portion 21 towards the desired gripping finger 10/11 stored in the gripping finger change device 30, such that the tooth-shaped fixing member 22 of the base portion 21 slides into the receiving portion 12 of the gripping finger 10/11. Finally, the spring-biased bolt 13 slips into the opening 23 of the tooth-shaped fixing member 22 fixing the gripping finger 10/11 to the base portion 21.

In order to remove a gripping finger 10/11 fixed to a base portion 21 the gripping device 20 inserts the gripping finger 10/11 fixed to the base portion 21 and to be removed into a free storage position 33 of the gripping finger change device 30. The gripping finger change device then controls the removing actuator 31, 32 to unplug the spring-biased bolt 13 out of the opening 23 of the tooth-shaped fixing member 22. Then the gripping device 20 removes the tooth-shaped fixing member 22 out of the receiving portion 12 of the gripping finger 10/11. The inclined tines 34 in their removing positions together with the corresponding inner shape of the collar 14 provide a form fit and thus prevent a movement of the gripping finger 10/11 to be removed in z direction. Thus, the gripping device 20 removes the tooth-shaped fixing member 22 inserted into the receiving portion 12 of the gripping finger 10/11 by simply moving the tooth-shaped fixing member 22 in z direction.

The disclosure enables an easy and effective change of the gripping fingers. The gripping device can be equipped with a clipping mechanism that quickly and reliably attaches/detaches the gripping fingers. Multiple set of fingers can be stored in a pre-defined location while not in use. When the laboratory automation system, e.g., determines that sample containers are capped with so called flex caps, the gripping device exchanges the set of gripping fingers for the specialized gripping fingers required for flex caps.

The gripping fingers 11 of the second type may, e.g., be used for sample containers closed by flexible caps.

What is claimed is:

1. A gripping system comprising:
    gripping fingers of a first type,
    gripping fingers of a second type,
    a gripping device for handling sample containers, wherein the gripping device comprises:
        base portions, wherein a gripping finger of the first type and a gripping finger of the second type are releasably fixable to the base portions, and
        a drive, wherein the drive is adapted to move at least one of the base portions relative to the other base portions to cause a gripping or a releasing of a sample container, and
    a gripping finger change device,
        wherein the gripping finger change device is adapted to store gripping fingers of the first type and gripping fingers of the second type, and
    wherein the gripping finger change device is adapted to replace a gripping finger of the first type fixed to a base portion by a gripping finger of the second type,
    the base portions respectively comprise a tooth-shaped fixing member having an opening, and
    the gripping fingers of the first type and the gripping fingers of the second type respectively comprise:
        a receiving portion being formed such that the tooth-shaped fixing member is insertable into the receiving portion, and
        a spring-biased bolt, wherein the spring-biased bolt is inserted into the opening of the tooth-shaped fixing member by means of the spring force when the tooth-shaped fixing member is inserted into the receiving portion.

2. The gripping system according to claim 1, characterized in that the gripping fingers of the first type are configured to grip a first type of sample containers and the gripping fingers of the second type are configured to grip a second type of sample containers.

3. The gripping system according to claim 1, characterized in that the gripping fingers of the first type have a different finger length than the gripping fingers of the second type.

4. The gripping system according to claim 1, characterized in that the gripping finger change device comprises a removing actuator being adapted to remove a spring-biased bolt being inserted into an opening of a tooth-shaped fixing member out of the opening.

5. The gripping system according to claim 1, characterized in that the removing actuator comprises:
    fork-shaped removing members, and
    an electric drive, wherein the electric drive is adapted to translationally move the fork-shaped removing members, wherein when moved to a removing position the fork-shaped removing members exert a removing force being opposite to the spring force to the spring-biased bolt such that the spring-biased bolt is removed out of the opening.

6. The gripping system according to claim 5, characterized in that
    a collar is attached to a respective spring-biased bolt,
    a respective receiving portion is formed by a front wall and two side walls, wherein the front wall has an opening, wherein the spring-biased bolt extends through the opening of the front wall and wherein the collar is arranged outside of the opening, and
    a respective fork-shaped removing member comprises two inclined tines, wherein when moved to the removing position the inclined tines are placed between the front wall and the collar such that the spring-biased bolt is axially moved towards the inclined tines.

7. The gripping system according to claim 1, characterized in that in order to fix a gripping finger stored in the gripping finger change device to a base portion:
    the gripping device is adapted to move the base portion towards the gripping finger stored in the gripping finger change device to be fixed to the base portion, such that the tooth-shaped fixing member of the base portion is inserted into the receiving portion of the gripping finger stored in the gripping finger change device and the spring-biased bolt is inserted into the opening of the tooth-shaped fixing member.

8. The gripping system according to claim 1, characterized in that in order to remove a gripping finger fixed to a base portion:
    the gripping device is adapted to insert the gripping finger fixed to the base portion and to be removed into a free storage position of the gripping finger change device,
    the gripping finger change device is adapted to control the removing actuator to remove the spring-biased bolt being inserted into the opening of the tooth-shaped fixing member out of the opening, and
    the gripping device is adapted to remove the tooth-shaped fixing member inserted into the receiving portion of the gripping finger out of the receiving portion of the gripping finger.

9. The gripping system according to claim 8, characterized in that
    the removing actuator when actuated prevents a movement of the gripping finger to be removed in z direction, and
    the gripping device removes the tooth-shaped fixing member inserted into the receiving portion of the gripping finger by moving the tooth-shaped fixing member in z direction.

10. A laboratory automation system, comprising:
    a laboratory station, and
        a gripping system according to claim 1 transferring sample containers to and from the laboratory station.

* * * * *